May 8, 1945.   H. J. MASTENBROOK ET AL   2,375,431
CONTROL METHOD AND MECHANISM
Filed Jan. 20, 1943
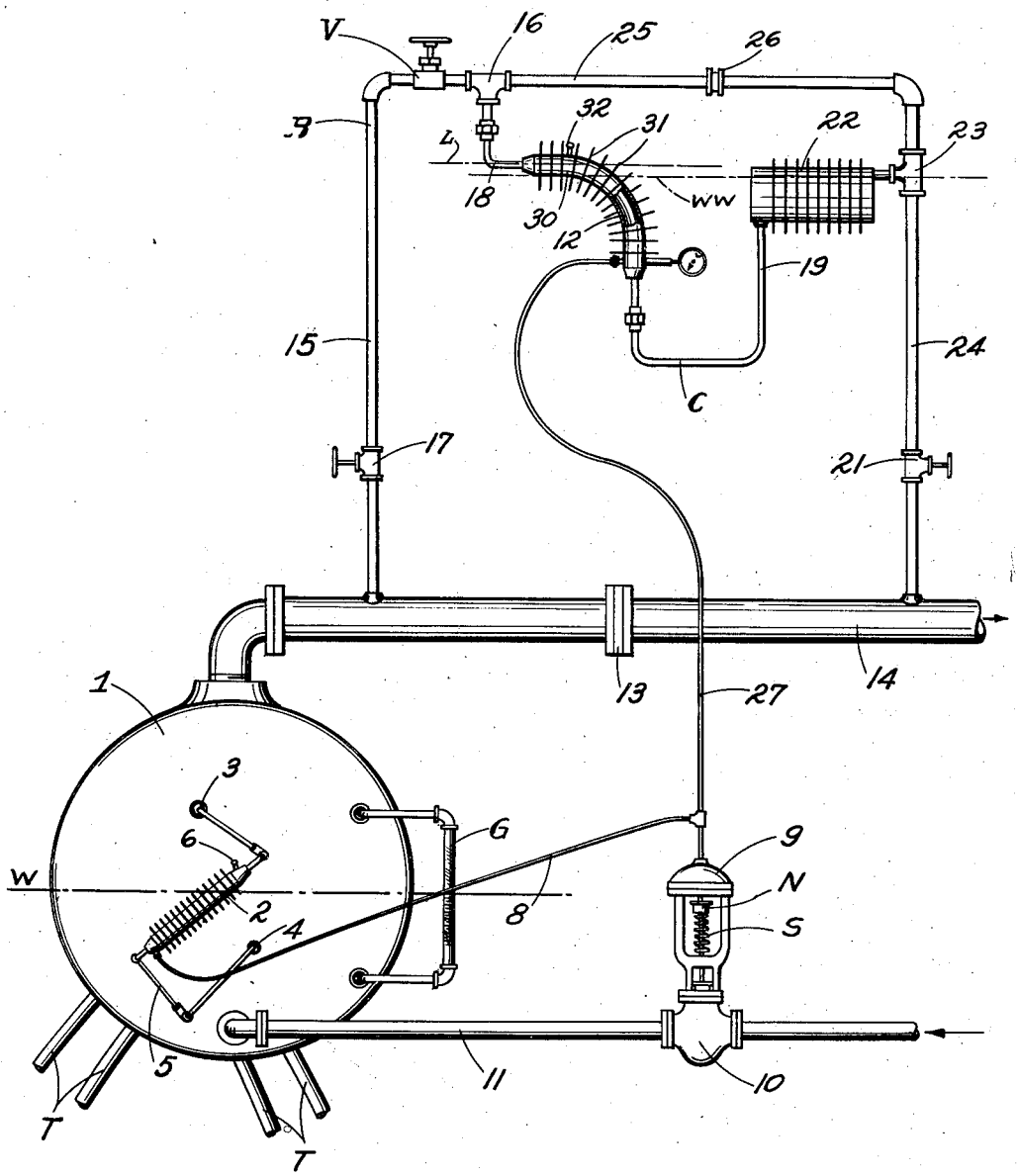
INVENTORS
HENRY J. MASTENBROOK
& DENTON K. SWARTWOUT III
BY
ATTORNEYS Patented May 8, 1945

2,375,431

UNITED STATES PATENT OFFICE 2,375,431

CONTROL METHOD AND MECHANISM

Henry J. Mastenbrook, Cleveland Heights, and Denton K. Swartwout III, University Heights, Ohio, assignors to The Swartwout Company, Cleveland, Ohio, a corporation of Ohio Application January 20, 1943, Serial No. 472,966

12 Claims. (Cl. 122—451.2)

This invention relates to a method and means for effecting a control such as the control of the flow of feed water to a boiler in response to changing conditions in and of the boiler. In some respects this invention may be regarded as an improvement upon the invention of Henry J. Mastenbrook, contained in the United States Patent No. 2,112,572, issued March 29, 1938. In this specification we have illustrated and described a preferred form of our invention in reference particularly to the control of feed water to a steam boiler particularly in relation to the flow of steam therefrom and to the water level therein.

In controlling the flow of feed water to steam boilers, the wide range of conditions under which different boilers are operated bear on the desirability of the relationship between the rate of flow of feed water to the rate of flow of steam and to the boiler water level. Those skilled in the art will appreciate that the boiler water level may not be permitted to rise above a height which might induce deleterious carry-over of water into the steam lines, nor should it be allowed to fall below a level which might injure the water tubes or the connections between such tubes and the steam drum. Within such ranges of variations, however, it is sometimes desired that the water level rise as the load increases maintaining or tending to maintain a substantially constant mass of water in the boiler. Other considerations of operation and perhaps also other types of boilers are sometimes advantageously operated with the water level lowered as the load increases. It has been appreciated that this method of regulation has the advantage of building up a reserve of heat during the conditions of low rating which is made available as the load increases. Still other conditions of operation and perhaps other types of boilers are advantageously operated with substantially constant water level throughout a wide range of loads and periods of change in load. Other circumstances and conditions invite that greater or controlling consideration be given to the relation between the input of water and the output of steam, sometimes demanding an approach to constancy in their relationship regardless of changes in water level so long as the level does not vary beyond safe limits.

In speaking above of the relation of the water level to the load, we have had in mind particularly the water level which is established after the change in the load has taken place rather than the surges incident to the periods of changing loads, albeit we are not unmindful of the surges as such and the effect and control thereof.

It is among the objects of our invention to provide a method and means of controlling the flow of feed water in which great facility is afforded to bring about whichever of the relationships of the rate of input of feed water to the outflow of steam and/or to the boiler water level that may be desired for the kind of boiler to which the control is applied and/or the kind of use to which a boiler is put.

Another object is to provide for a balance and apportionment of burdens between load regulation and water level regulation which may be adjusted to effect whatever character of control may be desired. Another object is to improve the response and character of load regulation so that its participation in the whole control may be relied upon and utilized from the instant the first increment of load comes on throughout the whole range of greater loads.

Another object of our invention is to provide a control for the flow of feed water with particular regard to the rate of outflow of steam therefrom and to the preservation of such a water level in the boiler drum as to protect the tubes leading thereinto and to prevent the carrying over of water into the steam outflow pipe. Other objects include the provision of a method and means for carrying out the foregoing objects which are economical of construction and are readily adapted to a wide field of installation and service and are dependable under widely different conditions of use.

The foregoing and other objects will be more fully apparent from the following description of our invention, reference being had to the accompanying drawing in which is shown in somewhat diagrammatic layout the arrangement of illustrative parts showing the essential relation of the novel means employed with which our method may be advantageously practiced.

The single figure of the drawing illustrates an apparatus embodying the invention.

It is convenient to illustrate and describe our invention in much the same environment as that in which the said Mastenbrook invention was illustrated and described and for that reason reference is made to that prior patent for a fuller description of these environmental matters. As shown in the drawing a boiler or steam drum 1, to which water tubes T lead, is shown as having a feed water pipe 11 and a steam outlet pipe 14. Controlling the flow of feed water through the pipe 11 is a feed water valve 10 having a pressure diaphragm chamber 9 in which valve opening pressures are developed against the force of a spring S, which may be adjustably tensioned by a nut N, tending to keep the valve closed. A fluid pressure generator 2, which for the sake of illustration may be of the type described in the Copley Patent No. 1,193,125, is connected by swivel joints and conduits 5, preferably in the manner taught in the Mastenbrook Patent No. 1,923,320, between points 3 and 4, respectively, above and below the boiler water level W. As is well known in the art such a thermo responsive device with appropriate radiating fins as shown and with a filling plug 6, is, when exposed to steam in its inner tube in response to a lowering of the water level W of the boiler drum 1, influenced to build up a fluid pressure which is carried to the pressure chamber 9 of the valve 10 by the conduit 8 tending to open the feed water valve in response to a lowering of the boiler water level.

The water level W as shown is intended to be at about the medium or average level desired, i. e., about midway of the gauge glass G. We have shown this level somewhat above the middle of the generator 2, indicating that we prefer, in apportioning the ordinary duties and burdens between this generator and the load responsive generator 12, to give the greater burden to the latter, while preserving enough capacity in the generator 2 both above and below the level W to avoid deleterious departures of the water level from safe limits.

Following in a general way the teaching of the prior Mastenbrook Patent No. 2,112,572 and differing therefrom and improving thereupon in the manner about to be described, we have provided a load responsive means or regulator to influence the opening of the feed water valve 10 in response to changes in boiler load. In the steam outlet pipe 14 is positioned a fixed orifice or orifice plate 13 across which there will be a substantial and measurable pressure drop varying in a determinable relation to the rate of flow of steam from the boiler. In selecting the orifice 13 we follow the teaching of the prior Mastenbrook patent in providing that the orifice offer a little more than enough resistance to safely make available all the pressure drop required for the various exigencies of control to be more fully described. It will become evident as this description proceeds that the desired amount of pressure drop across the orifice 13 will be substantially inconsequential in terms of delivery of steam from the boiler. Generally speaking, the pressure drop across an orifice such as the orifice 13 will increase substantially as the square of the rate of flow of steam through the orifice. Whether the drop be concisely as the square or not, we provide in the instrumentalities yet to be described means that compensate for the fact that the drop across the orifice 13 will have an exponential rather than a straight line function.

A bridge or shunt B is provided around the orifice 13 comprising the vertical conduits 15 and 24 and the horizontal conduit 25 connected together by elbows as shown. In each of the conduits 15 and 24 shut off valves 17 and 21 are provided. Within the conduit 25 at the left or upstream end as shown in the drawing, we provide a needle valve V through which, preferably to the exclusion of the valves 17 and 21, we throttle the flow of steam through the whole bridge or shunt circuit B. Down-stream of the needle or throttle valve V is a T 16 from which is taken off a bypass circuit C, leading into the conduit 24 through the T 23. Between the T's 16 and 23 in the conduit 25 preferably is a fixed orifice 26, the drop across which will substantially measure the drop between the T's 16 and 23 and hence across the bypass circuit. The bypass circuit comprises essentially the inner tube or conduit 18 of the fluid pressure generator 12, which may follow generally the Copley patent above referred to, comprising the inner tube 18 with the outer shell 30 spaced therefrom except where it has fluid tight connections at its end and as taught in the Copley patent has appropriate heat radiating fins 31, a filler plug 32 and adjacent its lower end, an appropriate connection for the conduit 27 leading to the diaphragm chamber 9 of the valve 10. Through appropriate unions the generator conduit 18 is attached to the T 16 at its upper end and at its lower end to the conduit 19 which in turn connects with the condensate reservoir 22 which also has appropriate heat radiating fins affording a cold water leg for the generator system. Overflow from the reservoir 22 drains into the conduit 24 through the T connection 23. It will be observed that the water level WW maintained by the reservoir 22 is positioned somewhat below the uppermost part of the generator 12.

The generator 12 departs from prior practice in its curved construction as shown in the drawing, being disposed with its lower end lying substantially vertical and with its upper end lying substantially horizontal, and with the axis of its upper end elevated to lie substantially at the level L somewhat above the condensate level WW to develop a standby pre-load to be more fully described. With the generator so constructed and positioned, it will be seen that when the generators are filled with fluid and the system is in operation, that is, when the valves 17, V, and 21 are open and even when the boiler is merely standing by, i. e., when there is substantially no pressure drop across the orifices 13 and 26, steam will enter the generator 12 within the conduit 18 down to the condensate level WW creating and building up a standby pressure in the generator 12. Under standby conditions, assuming the water level in the boiler to be at the level W it will be seen that both the generators 2 and 12 are contributing to the standby pressure in the generator system as a whole including the diaphragm chamber 9, and that any change in either of the levels W or WW will be very promptly reflected in the pressure in the diaphragm chamber 9 since the load responsive generator 12 as well as the water level responsive generator 2 are both active in heating and boiling the generator fluid during the standby condition. Of course, the tension in the spring S in the feed water valve is adjusted under these conditions through the nut N to keep the feed water valve 10 closed so long as no steam flows out of the boiler. As load comes on the boiler, i. e., as steam begins to flow through the pipe 14, steam will also tend to flow through the shunt circuit B at a rate depending primarily on the pressure drop across the orifice 13 and the opening of the needle valve V and secondarily on the line loss through the shunt circuit including the orifice 26. Since the latter factors are substantially constant, the flow through the shunt circuit in its relation to the drop across the orifice 13 can be controlled by adjustment by the needle valve V. As steam tends to flow through the shunt circuit pressure in the T 16 will rise in relation to the pressure in the T 23 because of the resistence of the orifice 26 and this differential in pressure will cause a lowering of the condensate level in the inner tube 18 in the generator 12 increasing the steaming area of the generator and inducing higher generated pressures in the diaphragm chamber 9 so long as the effort of the generator 2 remains constant or at least does not relax more than the effort of the generator 12 increases.

As shown in the drawing and mentioned above, the generator 12 has its long axis curved substantially in the form of a quadrant in the form which we prefer. In this form a much greater volume of generator surface is exposed for each increment of drop of the condensate level WW in the upper or more nearly horizontal portions of the generator than in the lower or more nearly vertical portions. Since, however, the pressure drop across the orifice 13 increases roughly as the square of the velocity of the steam flowing therethrough, the curved contour and disposition of the generator 12 in the association described tends to give substantially equal or at least desirable related added increments of generated pressure in proportion to increments of increase of the rate of flow of steam from the boiler.

We are cognizant of the "build up" in the spring S and the effects of the inherent stiffness of the diaphragm and the more or less compensatory shape of well known valve ports, which, taken with the fact that the relation of the drop across the orifice 13 may well not be exactly equal to the square of the steam velocity therethrough, present a group of factors that could be balanced with theoretical nicety against the precise curvature of the generator 12 so that for each increment of increase of outflow of steam to the pipe 14 an identical increment of increase in the flow of feed water through the pipe 11 might be had. For most practical purposes within our experience, the generator shaped as a quadrant and disposed substantially as shown and described substantially balances out these various factors where the valve 10 has its ports so shaped as to tend to give substantially equal increases in flow under equal increases in pressure in the diaphragm chamber 9, assuming that the head of feed water in front of the valve and/or the pressure drop across the valve is maintained substantially constant. It may be mentioned in passing, as those skilled in the art will also understand, that while we have shown a direct connection from the generators 2 and 12 to the diaphragm chamber 9 for the purpose of illustrating the instant invention, that other more sensitive instrumentalities such as master-controls or pilot valves may receive the generated pressure and in turn control independent pressure or energy sources for moving the feed water valve or other controlled instrumentality.

In the preferred form of our invention, the capacity of the generator 12 is such that when the condensate is forced down into the tube 18 from the level WW to that lowest level in or below the generator where the full pressure and work of the generator is developed that a little more than enough fluid will be forced through the conduit 27 into the diaphragm chamber 9 to move the valve 10 to its wide open position. We prefer, as above mentioned that this capacity produce "a little more than enough" fluid since we desire that this extra amount of fluid be available to move into the generator 2 through the conduit 8 to raise the level of fluid therein as against the internal pressure being developed within the generator 2 at least under some conditions to be more fully discussed below. The actual capacity or displacement of the generator 2 need not be arbitrarily defined in relation to the capacity of the generator 12 other than to point out that in its preferred form it need not be as large as the generator 12 since the work normally required of it is not intended to be as great. Suffice it to say that we prefer to utilize only about enough of the capacity or work of the generator 2 in its contribution with the generator 12 to the maintenance of or dissipation of pressure in the diaphragm chamber 9 to influence the valve 10 in a manner to prevent the water level W from exceeding dangerously high or low limits.

Since the needle or throttle valve V controls the flow through the shunt circuit B it will be understood that this flow may be so restricted that even when the boiler is under full load the level of condensate in the tube 18 of the generator 12 may be restrained to fall only a small amount or not at all. Under the latter condition all of the burden of regulation would fall on the generator 2 and under the former condition most of the regulation would be under the control of the generator 2. For the same reasons as the needle valve V is adjusted to a position of greater opening permitting a greater flow through the shunt circuit B, so will the condensate level in the tube 18 be depressed in greater amounts for relatively lesser boiler loads. In selecting the size of the orifices 13 and 26, we prefer for these reasons to select orifices of such sizes that at least when the needle valve V is wide open the condensate level in the tube 18 may be depressed to the full depth of the generator 12 a little prior to the condition of full boiler load, thus insuring with a reasonable margin of safety as wide a range of characteristics of regulation as may be desired in any installation. For these reasons it will be understood that adjustment of the valve V through a wide range of positions will give broad facility in causing the regulation as a whole to respond in greater or less proportions to the steam flow effect relative to the water level effect.

Let us assume for example, that the boiler is steaming at half load with the water level W substantially as shown, with the needle valve V in a median position and the level of the condensate in the tube 18 depressed somewhat below the level WW. As an increase in load comes, as from 50% to 60% rating, one immediate effect will be that the condensate level will fall in the tube 18, inducing greater effort from the generator 12, tending to increase the pressure in the diaphragm chamber 9 and increasing the opening of the valve 10. At the same time there is generally a surge upwardly of the water level W during the period of change in load which tends to be augmented by the increased input of feed water. Both of these factors tend to lift the level W and chill the generator 2 and reduce the pressure in the diaphragm chamber 9. We thus have immediate opposing tendencies as between the generators 2 and 12 in their influences upon the opening of the feed water valve 10, the generator 2 opposing the opening and the generator 12 encouraging it.

By adjustment of the needle valve V proportionately greater or lesser influence may be caused to be exerted by the generator 12 so that its tendency to open the feed valve 10 can on the one hand more than offset the tendency of the generator 2 to close the valve and on the other hand can be constrained to merely balance or do less than offset that tendency. We do not deem it desirable that the influence of the generator 2 be lost, since this might lead to dangerously high or low boiler water levels. However, by preserving enough influence from the generator 2 to prevent danger to the boiler and by using as much or little influence from the generator 12 as is desired through adjustment of the valve V, it will be seen that an increased flow of feed water may be had as soon as the load increases in spite of an initial upsurge of the level W, or the increase in feed may be wholly or partly delayed as may be desired. After the period of change of load passes and the boiler settles down to a steady flow at an increased rate, as in the example above, and the several immediate influences of and upon the generators have been resolved, the boiler water level will become established at a height related to the initial level W depending upon the relative influence of the two generators. It will be seen that the adjustment of the valve V will continue to have its influence tending to hold the boiler water level as high or as low as may be desired for a steady condition of increased rating within the limits of safety above mentioned.

Since by the means we have provided it is practicable, essentially by adjustment of the valve V, to induce higher or lower boiler water levels as the load increases or to do the same thing as the load decreases, it is equally practicable to maintain a substantially constant water level from no load to full load by adjusting the valve V to a median position. It will also be understood that in speaking of increases in load and the effect thereof that converse effects result from decreases in load and that the same kind of control may be had by the same kind of adjustment.

It will thus be seen that we have within the precepts of our invention provided a control for the regulation of the flow of feed water through which can be practiced any number of specified methods of regulation in terms of the relation of the flow of feed water to the outflow of steam and the water level desired to be maintained in the boiler. The influence of the boiler load regardless of degree and regardless of the amount of load, whether very great or very small, is felt promptly if not instantly by the preloading of the generator 12. The steam flow effect in its relative dominance of the control as a whole may be altered and adjusted at will through the needle valve V and may be constrained to conform within any reasonably desired accuracy to be in direct proportion to the load through the curvature of the generator 12 and its disposition in space and in its relation to the characteristics of the orifices 13 and 26. The influence of the water level control may be modified on the one hand, and as we prefer, to play an increasing part by the relative decrease in the influence of the load control as by throttling the flow through the valve V.

On the other hand the influences of the water level control may be modified as by changing the heights and angular disposition of the generator 2 through the connections 5 as is known in the art and these adjustments taken with the adjustment of the valve V gives additional refinement in the details and particulars of the control as a whole. For example, if the valve V is set to maintain a substantially constant boiler water level as at W at steady loads from no load to full load, then through the inclination of the generator 2 the rate of flow of feed water during the periods of change in load can be additionally influenced. With the generator 2 inclined more nearly the horizontal than the vertical, to be "fast" in its response, any up-surge of boiler water level will have a relatively greater effect in tending to close the feed valve 10 than were the generator 2 inclined more nearly the vertical than the horizontal, to be "slow" in its response. In this way the change in rate of feed will lag behind the change in load in greater degree while the load is changing as the generator 2 is inclined to a more fast response to an upsurge in the boiler water level. The converse follows as the generator 2 is inclined to a slower reaction.

With this facility of choice between different degrees of "fast" or "slow" responses to the effect of the changes in boiler water level and the facility with which the load responsive factors can be increased or decreased through adjustment of the valve V, it will be appreciated that substantially any desired character or kind of regulation can be had and maintained by the simple adjustments provided.

While we have illustrated and described a preferred form of apparatus for practicing our invention and a preferred method of controlling the flow of feed water, we do not mean to exclude equivalent elements or steps or modifications or improvements falling within the major precepts of our invention. While we have shown a preference for the use of the pressure generator of the Copley type, we do not mean to exclude other instrumentalities which respond by force and motion to the change of steam and condensate level in the environment thereof. While we have illustrated our generator system as connected directly to the diaphragm chamber of a feed water valve, we do not exclude the connection of the generator system to a pilot valve or master control or other intervening instrumentalities which in turn may be advantageously used to control the feed water valve. While we have illustrated and shown a preference for connecting the water level and load responsive generators together in a common fluid system, we do not exclude the use of separate fluid systems with mechanical whiffletree or other interconnections interposed between such systems and the feed water valve or the pilot or master control for the feed water valve. Other changes and modifications will occur to those skilled in the art without departing from the spirit of our invention, and we do not care to be limited to the preferred forms of method and apparatus herein described or in any manner other than by the claims appended hereto.

I claim:

1. The method of controlling the flow of feed water to a steam boiler which consists in the generation of a force which influences the flow of feed water positively as the boiler water level falls and negatively as the boiler water rises, generating a second force which influences the flow of feed water positively as the boiler load increases and negatively as the boiler load decreases, maintaining both said forces in substantial value before load is placed upon the boiler and while the boiler water level lies at a desired height, and opposing said forces with a third force in amount sufficient to prevent the input of feed water until steam flows from the boiler.

2. The method of controlling the flow of feed water to a steam boiler which consists in the generation of a force which influences the flow of feed water positively as the boiler water level falls and negatively as the boiler water rises, generating a second force which influences the flow of feed water positively as the boiler load increases and negatively as the boiler load decreases, maintaining both said forces in substantial amount before load is placed upon the boiler, opposing said forces with a third force in amount sufficient to prevent the input of feed water before load is placed on the boiler, and thereafter causing said second named force to increase in a predetermined relation to the rate at which said first named force decreases at least during an initial period of increase in load and rise in water level.

3. The method of controlling the flow of feed water to a steam boiler which consists in the generation of a force which influences the flow of feed water positively as the boiler water level falls and negatively as the boiler water rises, generating a second force which influences the flow of feed water positively as the boiler load increases and negatively as the boiler load decreases, maintaining said second forces in substantial amount before load is placed upon the boiler, opposing said forces with a third force in amount only sufficient to prevent the input of feed water before load is placed on the boiler, thereafter causing said second named force to increase in a predetermined relation to the rate at which said first named force decreases during a period of increase in load and rise in water level, and causing said first force to be modified as the boiler load reaches a constant value to the point where the sum of the first two forces induces an input of feed water equal to the output of steam and the maintenance of a predetermined boiler water level.

4. The method of controlling the flow of boiler feed water which consists in generating forces of increasing magnitude as the boiler load increases and in response to the increase in load and directing such forces to the opening of a feed water valve, diminishing such forces as the boiler load decreases to restrict the flow of feed water, and permitting the feed valve to close while maintaining such forces at a substantial value under the condition of no load on the boiler and at a value but just less than enough to open said value so that the effect of a small initial increment of boiler load will augment the existing forces tending to open said valve and induce an input of boiler feed water in prompt response to the initial increment of boiler load.

5. The method of controlling the flow of boiler feed water which consists in generating forces of increasing magnitude as the boiler load increases and in response to the increase in load and in substantially direct proportion thereto and directing such forces to the opening of a feed water valve, diminishing such forces in the same way as the boiler load decreases to restrict the flow of feed water, and closing the feed valve while maintaining such forces at a substantial value under the condition of no load on the boiler and at a value but just less than enough to open said valve so that the effect of a small initial increment of boiler load will augment the existing forces tending to open said valve and induce an input of boiler feed water in prompt response to the initial increment of boiler load and in proportion thereto.

6. The combination of a boiler having a steam outlet, means associated with said outlet maintaining a condensate level varying in height from maximum to minimum in inverse relation to the rate of flow of steam from said boiler, a feed water valve, a feed water regulator associated with said means and adapted to exert increasing valve opening influences as said condensate level falls, said regulator having a portion disposed at a higher level than the maximum condensate level and being energized while no steam is flowing from the boiler, and means yieldably holding said valve closed until said condensate level departs from said maximum level.

7. The combination of a boiler having a steam outlet, means associated with said outlet maintaining a condensate level varying in height from maximum to minimum in inverse relation substantially in proportion to an exponential function of the rate of flow of steam from said boiler, and a feed water regulator associated with said means and adapted to exert increasing feed valve opening influences as said condensate level falls, said regulator being of curved configuration and disposed to exert greater influences per unit of fall of condensate at low rates of steam flow than at higher rates.

8. The combination of a boiler having a steam outlet, means associated with said outlet maintaining a condensate level varying in height from maximum to minimum in inverse relation substantially in proportion to an exponential function of the rate of flow of steam from said boiler, and a feed water regulator associated with said means and adapted to exert increasing feed valve opening influences as said condensate level falls, said regulator having a portion disposed at a higher level than the maximum condensate level and being energized while no steam is flowing from the boiler, and said regulator being of curved configuration and disposed with its upper part approaching the horizontal and its lower part approaching the vertical.

9. The combination of a boiler having a steam outlet, means associated with said outlet maintaining a condensate level varying in height from maximum to minimum in inverse exponential relation to the rate of flow of steam from said boiler, a feed water valve, and a feed water regulator including a pressure generator associated with said means and adapted to exert increasing valve opening influences as said condensate level falls, said generator having a portion disposed at a higher level than the maximum condensate level and being energized while no steam is flowing from the boiler, and said generator being curved and disposed with its upper part more nearly level than its lower part.

10. In a boiler feed water system the combination of means responsive to the rate of outflow of steam for influencing the rate of input of feed water and means responsive to variations in boiler water level for influencing the rate of input of feed water, said first named means comprising a fluid pressure generator disposed in a part of the steam system and influenced by a pressure differential across a fixed resistance to the flow of steam from the boiler which differential varies as an exponential function of the rate of flow of steam from the boiler, said pressure generator being curved and disposed with respect to the vertical and horizontal in a manner in which increments of said pressure differential cause the generation of greater pressures at the lower boiler loads than do like increments at the higher boiler loads whereby the rate of change of generated pressure is in substantially direct proportion to the rate of change of boiler load throughout substantially the whole range of boiler loads, said feed water level responsive means having a substantially limited influence to change the rate of flow of feed water into the boiler.

11. In a boiler feed water system the combination of a load control and a boiler water level control both influencing the rate of flow of feed water, the load control comprising a curved pressure generator disposed in a part of the steam system which is shunted around a fixed orifice the pressure drop across which varies substantially as the square of the rate of flow of steam from the boiler through said orifice and said curved generator being connected in said shunted system in a bypass with a condensate reservoir whereby the level of condensate in said generator rises to a maximum when no steam is flowing through said orifice and is depressed in said generator to a minimum level at full boiler load, said generator having a portion thereof embracing the lower condensate levels standing substantially vertical and having its upper portions curving toward the horizontal and having its uppermost portion disposed above the maximum condensate level, said boiler water level control comprising pressure generator means of smaller utilized volumetric capacity than said first mentioned generator and disposed in relation to said boiler water level at a level conducive to the doing of less work than said first mentioned generator throughout substantially the whole range of boiler loads.

12. In a boiler feed water control system the combination of a feed water valve, means responsive to fluid pressures for opening said valve, means associated with said first named means for adjustably resisting the force of said pressures to hold said valve closed against less than a determinable minimum pressure, a fluid pressure generator associated with the steam outlet from the boiler in a shunt system within which a steam and condensate column falls within said generator in response to increases in load on said boiler, said generator being disposed to have a portion above said condensate level whereby to develop a standby pressure before steam flows from said boiler, a second fluid pressure generator associated with the steam drum of the boiler and spanning the water level therein and embracing a steam and condensate column rising and falling with the boiler water level and also generating a standby pressure before steam flows from the boiler, connections from both said generators for transmitting said generated pressures to said first named means, and means for apportioning the work done between said generators in respect to the boiler load and water level respectively.

HENRY J. MASTENBROOK.
DENTON K. SWARTWOUT III.